United States Patent
Choi et al.

(10) Patent No.: US 11,525,551 B1
(45) Date of Patent: Dec. 13, 2022

(54) LIGHTING DEVICE FOR VEHICLE

(71) Applicant: HYUNDAI MOBIS CO., LTD., Seoul (KR)

(72) Inventors: Ban Suk Choi, Yongin-si (KR); Seung Woo Baek, Yongin-si (KR); Hyoung Jin Choi, Yongin-si (KR); Jun Hyuk Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/570,428

(22) Filed: Jan. 7, 2022

(30) Foreign Application Priority Data

Oct. 13, 2021 (KR) .................. 10-2021-0135587

(51) Int. Cl.
| | | |
|---|---|---|
| *F21S 41/32* | (2018.01) | |
| *F21S 41/43* | (2018.01) | |
| *F21S 41/33* | (2018.01) | |
| *F21V 14/02* | (2006.01) | |
| *F21S 41/148* | (2018.01) | |

(Continued)

(52) U.S. Cl.
CPC .............. *F21S 41/32* (2018.01); *F21S 41/43* (2018.01); *B60R 19/52* (2013.01); *B60R 2019/525* (2013.01); *F21S 41/147* (2018.01); *F21S 41/148* (2018.01); *F21S 41/33* (2018.01); *F21S 41/331* (2018.01); *F21S 41/332* (2018.01); *F21S 41/333* (2018.01); *F21S 41/334* (2018.01); *F21S 41/335* (2018.01); *F21S 41/336* (2018.01); *F21S 41/337* (2018.01); *F21S 41/338* (2018.01); *F21V 7/048* (2013.01); *F21V 14/02* (2013.01); *F21V 14/025* (2013.01); *F21V 21/26* (2013.01);
(Continued)

(58) Field of Classification Search
CPC .. B60R 19/52; B60R 2019/525; F21S 41/335; F21S 41/336; F21S 41/337
See application file for complete search history.

(56) References Cited

U.S. PATENT DOCUMENTS

| | | | | |
|---|---|---|---|---|
| 1,998,680 A | * | 4/1935 | Lint | .......................... B60Q 1/05 362/502 |
| 2,403,856 A | * | 7/1946 | Gonzalez | ................ F21V 11/00 362/517 |

(Continued)

FOREIGN PATENT DOCUMENTS

| | | |
|---|---|---|
| AT | 518029 B1 | 9/2017 |
| CN | 107329325 A * | 11/2017 |

(Continued)

OTHER PUBLICATIONS

Office Action dated Jun. 9, 2022 in the corresponding German Patent Application No. 102021006212.4.

*Primary Examiner* — Colin J Cattanach
(74) *Attorney, Agent, or Firm* — NovoTechIP International PLLC (57) ABSTRACT

The present disclosure relates to a lighting device for a vehicle, including a housing unit positioned on a vehicle body and configured to have an opening, a light source unit positioned on the housing unit and configured to radiate light, a reflection unit provided in the housing unit and configured to reflect the light, radiated by the light source unit, by differently setting a reflection angle for each section, and a screen unit positioned on the housing unit and configured to cover the opening and implement grill lighting by transmitting the light reflected by the reflection unit.

16 Claims, 11 Drawing Sheets

(51) Int. Cl.
  *F21V 21/26* (2006.01)
  *F21S 41/147* (2018.01)
  *F21V 21/30* (2006.01)
  *B60R 19/52* (2006.01)
  *F21V 21/29* (2006.01)
  *F21V 21/28* (2006.01)
  *F21V 7/04* (2006.01)

(52) U.S. Cl.
  CPC ............... *F21V 21/28* (2013.01); *F21V 21/29* (2013.01); *F21V 21/30* (2013.01)

(56) References Cited

U.S. PATENT DOCUMENTS

| | | | | |
|---|---|---|---|---|
| 5,054,885 | A * | 10/1991 | Melby | F21V 7/00 359/638 |
| 6,454,443 | B2 * | 9/2002 | Natsume | F21S 41/334 362/346 |
| 2007/0058382 | A1 * | 3/2007 | Lan | B60Q 1/2661 362/487 |
| 2007/0217193 | A1 * | 9/2007 | Lin | F21S 4/20 362/245 |
| 2007/0263388 | A1 * | 11/2007 | Lai | F21V 14/02 362/287 |
| 2010/0172152 | A1 * | 7/2010 | Boonekamp | F21V 13/08 362/609 |
| 2011/0032698 | A1 * | 2/2011 | Kim | F21V 7/0008 362/235 |
| 2011/0286202 | A1 * | 11/2011 | Kim | G02F 1/133615 362/97.1 |
| 2013/0293104 | A1 * | 11/2013 | Wu | B60Q 1/2661 315/77 |
| 2016/0090027 | A1 * | 3/2016 | Tanaka | B60Q 1/50 362/516 |
| 2019/0256025 | A1 * | 8/2019 | Dickson | B60Q 1/2661 |
| 2019/0389412 | A1 * | 12/2019 | Walters | B60Q 3/64 |
| 2020/0130560 | A1 * | 4/2020 | Gutierrez | B60Q 1/0005 |
| 2020/0189503 | A1 * | 6/2020 | Salter | F21S 43/14 |
| 2021/0312840 | A1 * | 10/2021 | Kim | B60Q 1/503 |

FOREIGN PATENT DOCUMENTS

| | | | |
|---|---|---|---|
| DE | 102004055015 A1 | 6/2006 | |
| DE | 112016000952 T5 | 11/2017 | |
| EP | 3825601 A1 | 5/2021 | |
| JP | 2012113969 A * | 6/2012 | |
| KR | 20090083546 A * | 8/2009 | |
| KR | 1020200040014 A | 4/2020 | |
| WO | WO-2005018987 A1 * | 3/2005 | ........... B60Q 1/2661 |

* cited by examiner

LIGHTING DEVICE FOR VEHICLE

CROSS-REFERENCE TO RELATED APPLICATION

This application claims priority from and the benefit of Korean Patent Application No. 10-2021-0135587, filed on Oct. 13, 2021, which is hereby incorporated by reference for all purposes as if set forth herein.

BACKGROUND

Field

Exemplary embodiments of the present disclosure relate to a lighting device for a vehicle, and more particularly, to a lighting device for a vehicle, which can implement grill lighting while minimizing the number of light sources.

Discussion of the Background

In general, various heat exchangers, such as a radiator, an intercooler, an evaporator, and a compressor for cooling parts within a vehicle, such as an engine, or adjusting an air temperature inside the vehicle, in addition to a part for driving, such as the engine, are provided within the engine room of the vehicle.

In general, a heat exchange medium flows within such heat exchangers. Cooling or heat dissipation is performed through a heat exchange between the heat exchange medium within the heat exchanger and the air outside the heat exchanger. Accordingly, in order for various heat exchangers within the engine room of the vehicle to stably operate, an external air needs to be smoothly supplied to the inside of the engine room.

To this end, a radiator grill is provided at the front bumper of the vehicle so that the external air is introduced into the engine room. At least one radiator grill is provided depending on the type and shape of the vehicle.

The design of a recently developed electric vehicle is improved in a way that the radiator grill is removed because the engine heated in the engine room is removed and grill lighting is implemented.

However, the conventional art has problems in that many light sources are used to implement grill lighting, which causes an increase in a unit cost of goods, and the light sources are driven and heated. Accordingly, there is a need for solving the problems.

The Background of the present disclosure is disclosed in Korean Patent Application Publication No. 2020-0040014 (published on Apr. 17, 2020 and entitled "Integration type Grill Lighting System and Vehicle Thereof.")

SUMMARY

Various embodiments are directed to providing a lighting device for a vehicle, which can implement grill lighting while minimizing the number of light sources.

In an embodiment, a lighting device for a vehicle includes a housing unit mounted on a vehicle body and having one open portion, a light source unit mounted on the housing unit and configured to emit light, a reflection unit provided in the housing unit and configured to reflect the light radiated by the light source unit by differently setting a reflection angle for each section, and a screen unit mounted on the housing unit and configured to cover the open portion and implement grill lighting by transmitting the light reflected by the reflection unit.

The housing unit may be disposed in any one or more of a front part, side part, and rear part of the vehicle body.

The housing unit may include a housing rear part in which the reflection unit is disposed, a housing top part extended forward from the top of the housing rear part and configured to reflect light, and a housing bottom part extended forward from the bottom of the housing rear part, disposed to face the housing top part and configured to reflect light.

The light source unit may include a light source case part mounted on an edge of the housing unit and a light source lamp part mounted on the light source case part and configured to radiate light to the reflection unit when power is applied thereto.

The light source unit may further include a light source rotation part configured to rotate the light source case part.

The light source unit may further include a light source transmission part mounted on the light source case part and configured to transmit the light radiated by the light source lamp part and a light source change part provided in the light source transmission part and configured to change a light pattern.

The reflection unit may include a reflection base part, a plurality of reflection protrusion parts protruding from the reflection base part, and a reflection surface part formed at the end of each of the reflection protrusion parts and configured to reflect the light of the light source unit radiated from the side of the reflection unit.

The light source unit may be disposed at one edge of the housing unit. The reflection surface part may be disposed to be further protruding forward as the reflection surface part becomes distant from the light source unit.

The light source unit may be disposed at either edge of the housing unit. The reflection surface parts may be disposed to further protrude forward from each edge of the reflection base part to a central part thereof.

The reflection base part may be a plane. Lengths of the reflection protrusion parts adjacent to each other may be different from each other.

The reflection base part may be a curved surface. Lengths of the reflection protrusion parts may be identical to or different from one another.

The reflection unit may be assembled with the housing unit.

The reflection unit may be integrated with the housing unit.

The screen unit may include a screen body part mounted on the housing unit, a screen blocking part disposed on the inside of the screen body part and configured to block the transmission of light, and a screen transmission part disposed on the inside of the screen body part and configured to permit the transmission of light.

The reflection surface part may have a tilt angle that increases as the reflection surface part becomes distant from the light source unit.

One or more reflection surface parts may be selectively disposed along an up and down length of the reflection protrusion part. The reflection surface part may have a pattern or a figure shape.

The lighting device for a vehicle according to the present disclosure can implement grill lighting for the vehicle while minimizing the number of light source units because light of the light source unit radiated from the side of the reflection unit passes through the screen unit after being reflected by the reflection unit.

DETAILED DESCRIPTION OF THE ILLUSTRATED EMBODIMENTS

Hereinafter, embodiments of a lighting device for a vehicle according to the present disclosure will be described below with reference to the accompanying drawings. In such a process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 1:
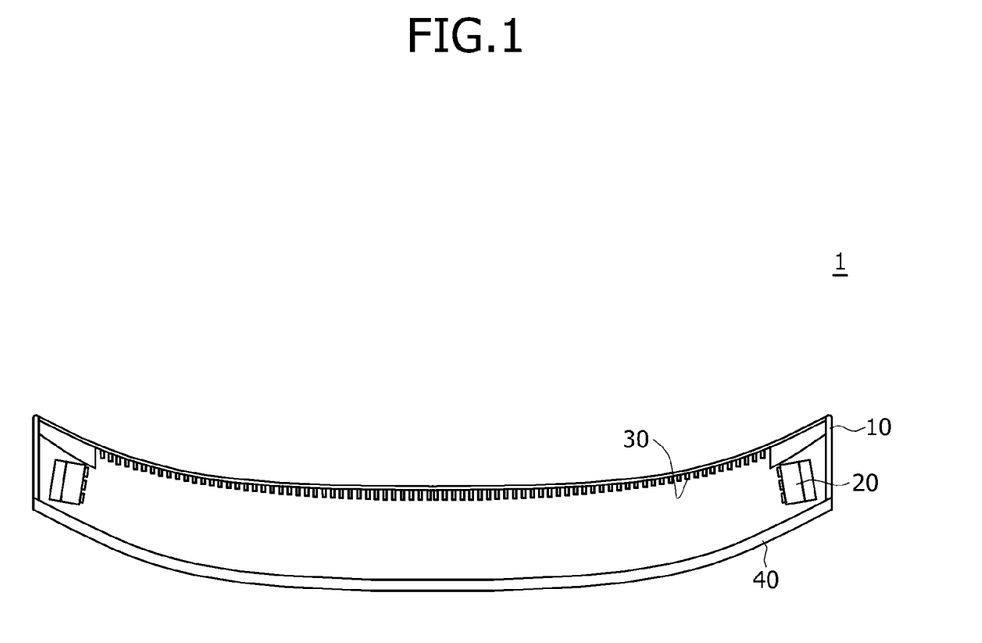
FIG. 1 is a diagram schematically illustrating a lighting device for a vehicle according to an embodiment of the present disclosure.
Figure 2:
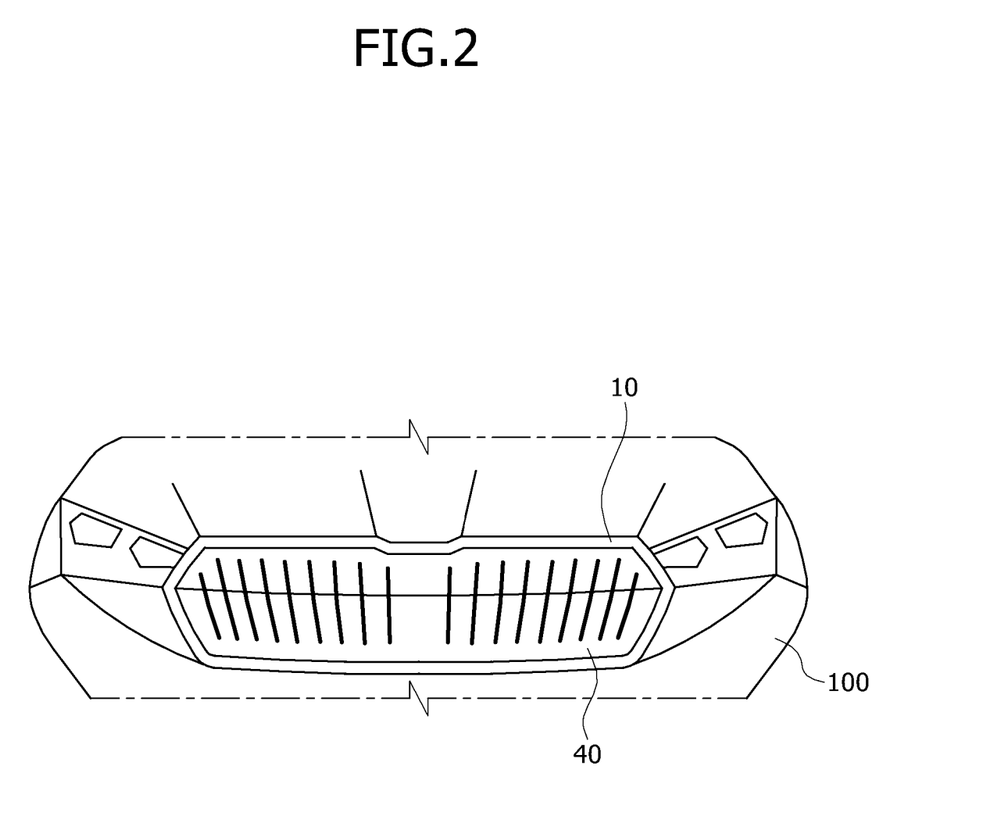
FIG. 2 is a diagram schematically illustrating the state in which the lighting device for a vehicle according to an embodiment of the present disclosure has been disposed.

FIG. 1 is a diagram schematically illustrating a lighting device for a vehicle according to an embodiment of the present disclosure. FIG. 2 is a diagram schematically illustrating the state in which the lighting device for a vehicle according to an embodiment of the present disclosure has been disposed. Referring to FIGS. 1 and 2, a lighting device 1 for a vehicle according to an embodiment of the present disclosure includes a housing unit 10, a light source unit 20, a reflection unit 30, and a screen unit 40.

The housing unit 10 is positioned on a vehicle body 100. The housing unit 10 has an opening. For example, the housing unit 10 may have an open front part. Furthermore, the housing unit 10 may have both open ends.

The light source unit 20 is positioned on the housing unit 10, and radiates light. For example, the light source unit 20 may be disposed at the end of the housing unit 10 on one side thereof or both ends of the housing unit 10 on both sides thereof, and may radiate light.

The reflection unit 30 is provided in the housing unit 10, and reflects the light radiated by the light source unit 20, by changing a reflection angle for reflecting the light. For example, the reflection unit 30 may be disposed in the rear of the housing unit 10, and may reflect light, radiated by the light source unit 20 disposed at a side end of the housing unit 10, to the open front part of the housing unit 10. The reflection unit 30 may have a different reflection angle depending on a distance between the reflection unit 30 and the light source unit 20. Accordingly, although the amount of light is insufficient because the reflection unit 30 is distant from the light source unit 20, light can be uniformly emitted.

The screen unit 40 is positioned on the housing unit 10, and covers the opening of the housing unit 10 and implements grill lighting by transmitting light reflected by the reflection unit 30. For example, the screen unit 40 and the housing unit 10 may be two separate units that are assembled together, and may be designed to have a different light transmission region so that grill lighting having various designs are implemented. Furthermore, the screen unit 40 may be selected and positioned on the housing unit 10 depending on a user preference.

The housing unit 10 is disposed in any one of the front part, side part and rear part of the vehicle body 100. For example, the housing unit 10 may be positioned on an electric vehicle, and may be disposed in a radiator grill region through which the air passes in order to cool an engine room in an internal-combustion engine vehicle. In addition, the housing unit 10 may be disposed in a door or trunk region.

Figure 3:
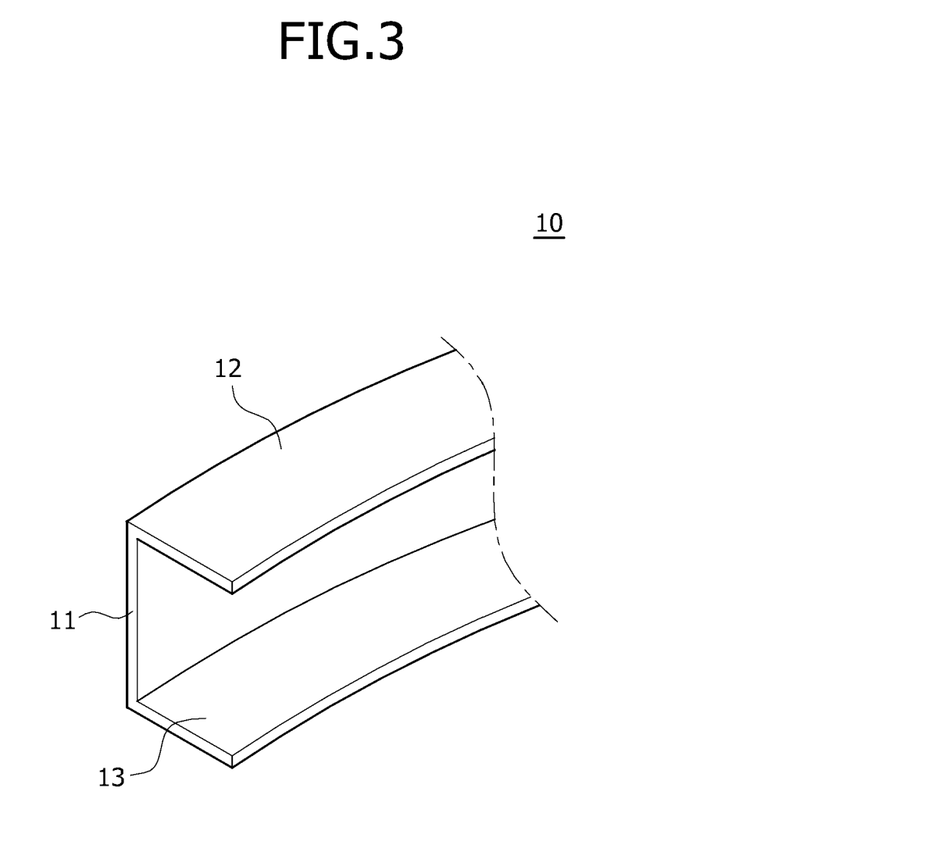
FIG. 3 is a diagram schematically illustrating a housing unit according to an embodiment of the present disclosure.

FIG. 3 is a diagram schematically illustrating the housing unit according to an embodiment of the present disclosure. Referring to FIG. 3, the housing unit 10 according to an embodiment of the present disclosure includes a housing rear part 11, a housing top part 12, and a housing bottom part 13.

The reflection unit 30 is disposed in the housing rear part 11. For example, the reflection unit 30 may be disposed at the front of the housing rear part 11.

The housing top part 12 extends forward from the top of the housing rear part 11. For example, the housing top part 12 can suppress a loss of light by reflecting light forward or in the direction of the housing rear part 11.

The housing bottom part 13 extends forward from the bottom of the housing rear part 11 and disposed to face the housing top part 12. For example, the housing bottom part 13 can suppress a loss of light by reflecting light forward or in the direction of the housing rear part 11.

The housing rear part 11, the housing top part 12, and the housing bottom part 13 may be integrally produced. A separate reflection layer for light reflection may be formed in the housing top part 12 and the housing bottom part 13.

Figure 4:
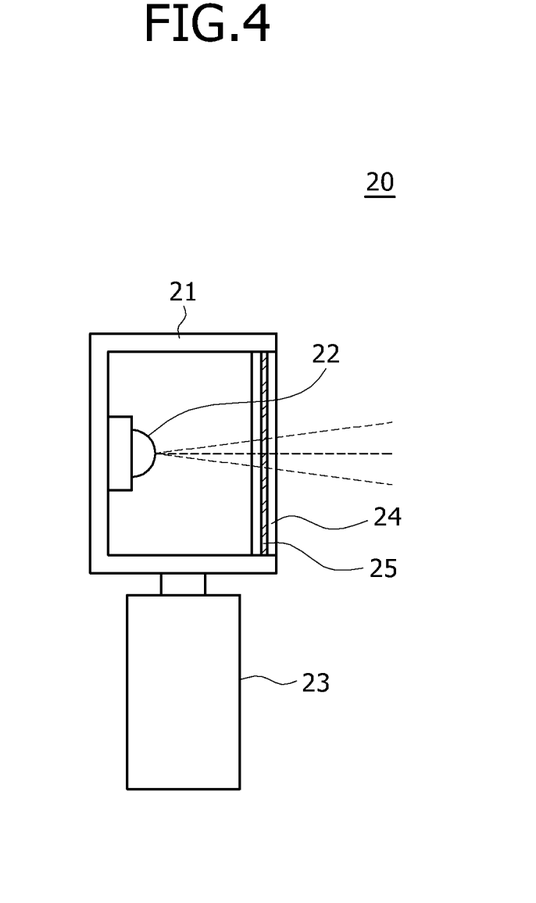
FIG. 4 is a diagram schematically illustrating a light source unit according to an embodiment of the present disclosure.
Figure 5:
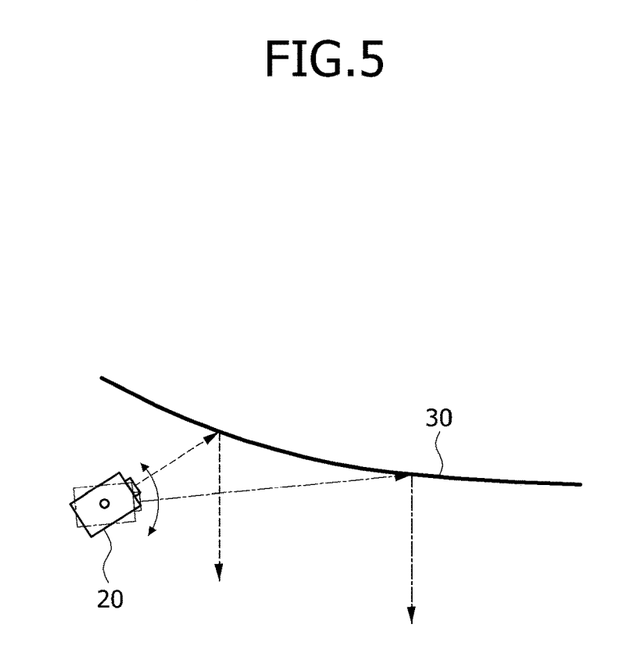
FIG. 5 is a diagram schematically illustrating the state in which the light source unit according to an embodiment of the present disclosure is rotated.

FIG. 4 is a diagram schematically illustrating the light source unit according to an embodiment of the present disclosure. FIG. 5 is a diagram schematically illustrating the state in which the light source unit according to an embodiment of the present disclosure is rotated. Referring to FIGS. 4 and 5, the light source unit 20 according to an embodiment of the present disclosure includes a light source case part 21 and a light source lamp part 22.

The light source case part 21 is positioned on the edge of the housing unit 10. For example, the light source case part 21 may be disposed at one end or both ends of the housing top part 12 or the housing bottom part 13.

The light source lamp part 22 is positioned on the light source case part 21, and radiates light to the reflection unit 30 when a power is applied thereto. For example, the light source lamp part 22 may include a board and a lamp for controlling the amount and turn-on and turn-off of light. An LED may be used as the lamp.

The light source unit 20 according to an embodiment of the present disclosure may further include a light source rotation part 23. The light source rotation part 23 rotates the light source case part 21. For example, when the light source case part 21 is rotated by the light source rotation part 23, the radiation region of light radiated by the light source lamp part 22 may be changed.

For example, if the light source case part 21 is fixed, the light source lamp part 22 may have a wide radiation angle so that light reaches the entire region of the reflection unit 30. Accordingly, when the light is radiated, grill lighting can be implemented because the light is reflected by the entire region of the reflection unit 30.

In contrast, if the light source rotation part 23 rotates the light source case part 21, the light source lamp part 22 may have a narrow radiation angle so that light reaches a partial region of the reflection unit 30. Accordingly, as the light source lamp part 22 is rotated, a grill lighting region may be changed because a process of the light being partially radiated to the reflection unit 30 is repeated.

The light source unit 20 according to an embodiment of the present disclosure may further include a light source transmission part 24 and a light source change part 25. The light source transmission part 24 is positioned on the light source case part 21, and transmits light radiated by the light source lamp part 22. For example, the light source transmission part 24 may include one or more lenses and may guide the directivity of light. The light source change part 25 is provided in the light source transmission part 24 and changes a light pattern. For example, the light source change part 25 may be attached to the light source transmission part 24 or may be replaced. The light source change part 25 may select a light transmission region and may variously implement a pattern of transmitted light.

Figure 6:
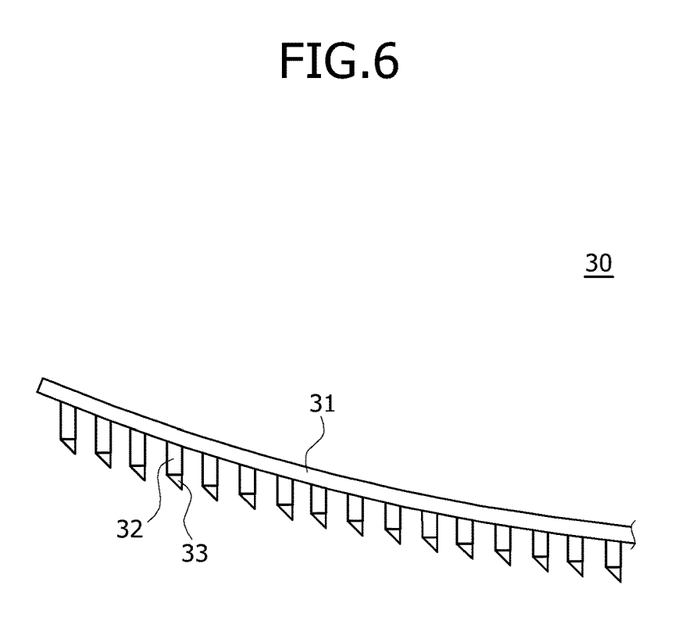
FIG. 6 is a diagram schematically illustrating a reflection unit according to an embodiment of the present disclosure.

FIG. 6 is a diagram schematically illustrating the reflection unit according to an embodiment of the present disclosure. Referring to FIG. 6, the reflection unit 30 according to an embodiment of the present disclosure includes a reflection base part 31, a reflection protrusion part 32, and a reflection surface part 33.

The reflection protrusion part 32 protrudes from the reflection base part 31. The reflection protrusion part 32 may extends forward from the front of the reflection base part 31. The reflection protrusion part may be provided in plural, and a plurality of reflection protrusion parts 32 may be disposed to be isolated from each other in the length direction of the reflection base part 31.

The reflection surface parts 33 is formed at the end of each of the reflection protrusion parts 32, and reflects light of the light source unit 20, which is radiated from the side of the reflection unit 30. For example, the reflection surface part 33 may be an inclined plane formed at the end of the reflection protrusion part 32. Light reflected by the reflection surface part 33 may reach the screen unit 40 disposed in front of the reflection surface part 33.

Figure 7:
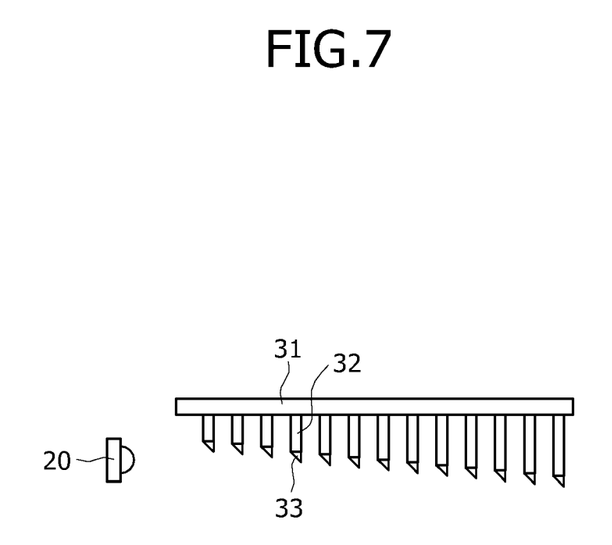
FIG. 7 is a diagram schematically illustrating the state in which the reflection unit according to an embodiment of the present disclosure reflects light radiated by the light source unit disposed on one side thereof.

FIG. 7 is a diagram schematically illustrating the state in which the reflection unit according to an embodiment of the present disclosure reflects light radiated by the light source unit disposed on one side thereof. Referring to FIG. 7, the light source unit 20 is disposed at one edge of the housing unit 10. In this case, a protrusion amount of the reflection surface part 33 may be proportional to a distance between the reflection surface part 33 and the light source unit 20. Accordingly, light radiated by the light source unit 20 can reach the respective reflection surface parts 33.

Figure 8:
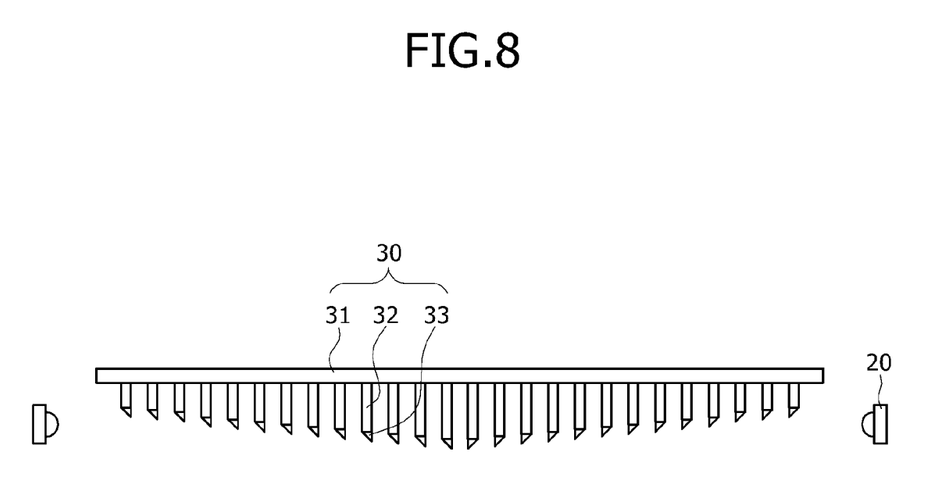
FIG. 8 is a diagram schematically illustrating the state in which the reflection unit according to an embodiment of the present disclosure reflects light radiated by the light source units disposed on both sides thereof.

FIG. 8 is a diagram schematically illustrating the state in which the reflection unit according to an embodiment of the present disclosure reflects light radiated by the light source units disposed on both sides thereof. Referring to FIG. 8, the light source unit 20 is disposed at either edge of the housing unit 10. In this case, protrusion amounts of the reflection surface parts 33 may be proportional to a distance between each reflection surface part 33 and a center of the reflection base part 31. Accordingly, light radiated by the pair of light source units 20 can reach the respective reflection surface parts 33.

Figure 9:
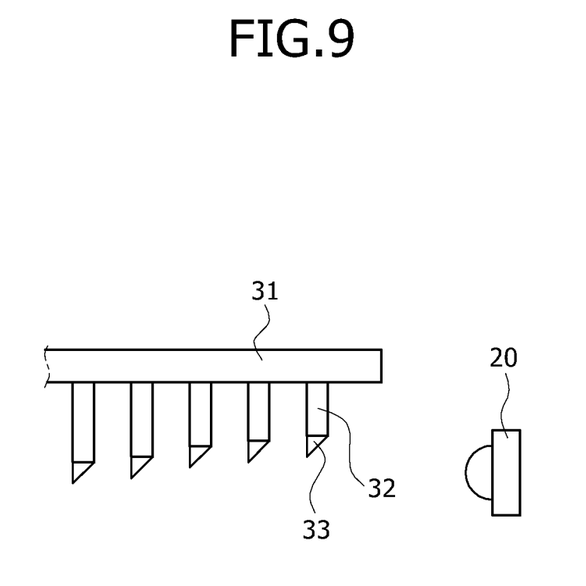
FIG. 9 is a diagram schematically illustrating the lengths of reflection protrusion parts when a reflection base part according to an embodiment of the present disclosure is a plane.

FIG. 9 is a diagram schematically illustrating the lengths of the reflection protrusion parts when the reflection base part according to an embodiment of the present disclosure is a plane. Referring to FIG. 9, the reflection base part 31 is a plane, and the lengths of the plurality of reflection protrusion parts 32 protruding from the reflection base part 31 are different from one another. For example, if one light source unit 20 is disposed on one side of the reflection unit 30, any one reflection protrusion part 32 may be formed to have a greater length than another reflection protrusion part 32 disposed more closely to the light source unit 20 than the any one reflection protrusion part 32.

Figure 10:
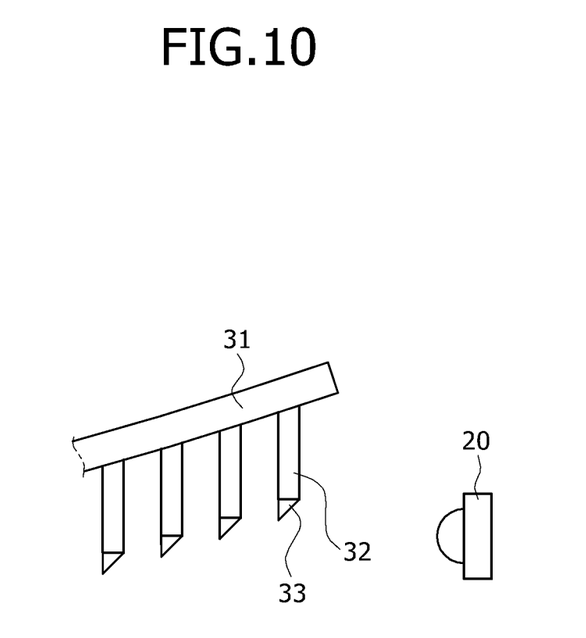
FIG. 10 is a diagram schematically illustrating the state in which the lengths of the reflection protrusion parts are identical to one another when the reflection base part according to an embodiment of the present disclosure is a curved surface.
Figure 11:
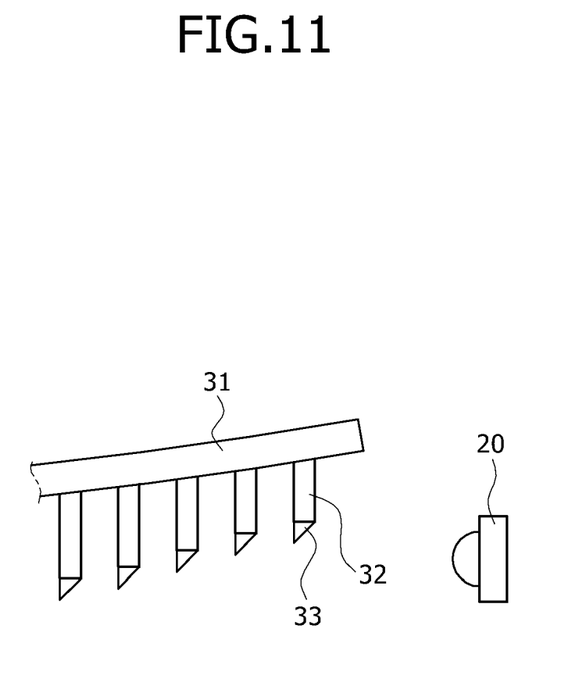
FIG. 11 is a diagram schematically illustrating the state in which the lengths of the reflection protrusion parts are different from one another when the reflection base part according to an embodiment of the present disclosure is a curved surface.

FIG. 10 is a diagram schematically illustrating the state in which the lengths of the reflection protrusion parts are identical to one another when the reflection base part according to an embodiment of the present disclosure is a curved surface. FIG. 11 is a diagram schematically illustrating the state in which the lengths of the reflection protrusion parts are different from one another when the reflection base part according to an embodiment of the present disclosure is a curved surface. Referring to FIGS. 10 and 11, the reflection base part 31 is a curved surface, and the lengths of the plurality of reflection protrusion parts 32 protruding from the reflection base part 31 are identical to or different from one another. For example, if one light source unit 20 is disposed on one side of the reflection unit 30, the end of any one reflection protrusion part 32 may further protrude forward than the end of another reflection protrusion part 32 disposed more closely to the light source unit 20 than the any one reflection protrusion part 32. In this case, the lengths of the reflection protrusion parts 32 may be identical to or different from one another depending on curvature of the reflection base part 31. The reflection base part 31 may be an inclined plane in addition to the curved surface.

Figure 12:
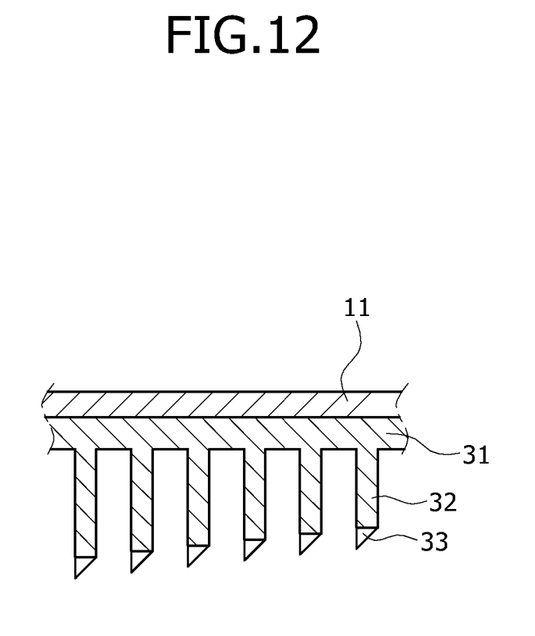
FIG. 12 is a diagram schematically illustrating the state in which the reflection unit according to an embodiment of the present disclosure has been assembled with the housing unit.

FIG. 12 is a diagram schematically illustrating the state in which the reflection unit according to an embodiment of the present disclosure has been assembled with the housing unit. Referring to FIG. 12, the reflection unit 30 according to an embodiment of the present disclosure is assembled with the housing unit 10. More specifically, the reflection base part 31 may be screwed or hooked with the housing rear part 11. The reflection unit 30 may be integral to the housing unit 10. The reflection unit 30 suitable for a grill lighting shape to be implemented may be positioned on the housing unit 10 and may be replaced, if necessary.

Figure 13:
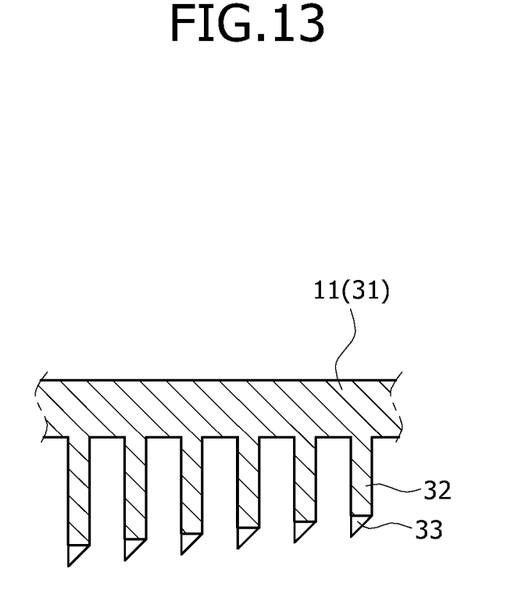
FIG. 13 is a diagram schematically illustrating the state in which the reflection unit according to an embodiment of the present disclosure is integral to the housing unit.

FIG. 13 is a diagram schematically illustrating the state in which the reflection unit according to an embodiment of the present disclosure is integral to the housing unit. Referring to FIG. 13, the reflection unit 30 and the housing unit 10 according to an embodiment of the present disclosure are integrally produced. More specifically, the reflection base part 31 may be shaped by being integral to the housing rear part 11. Accordingly, the housing unit 10 and the reflection unit 30 may be shaped by being integrated together.

Figure 14:
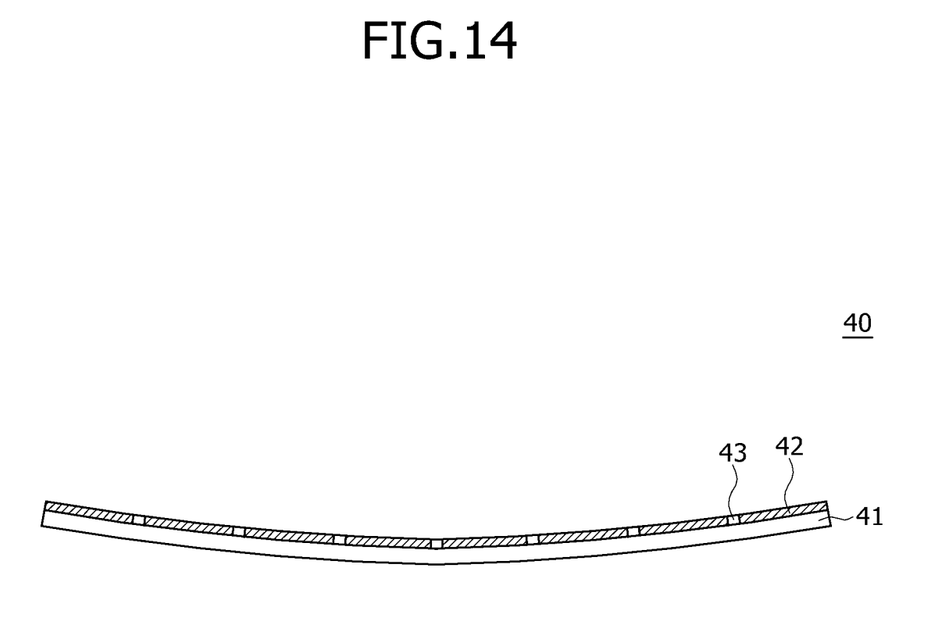
FIG. 14 is a diagram schematically illustrating a screen unit according to an embodiment of the present disclosure.

FIG. 14 is a diagram schematically illustrating the screen unit according to an embodiment of the present disclosure. Referring to FIG. 14, the screen unit 40 according to an embodiment of the present disclosure includes a screen body part 41, a screen blocking part 42, and a screen transmission part 43.

The screen body part 41 is positioned on the housing unit 10. For example, the screen body part 41 may be assembled with the front ends of the housing top part 12 and the housing bottom part 13 in a way to be attachable thereto or detachable therefrom.

The screen blocking part 42 is disposed on the inside of the screen body part 41, and blocks the transmission of light. Furthermore, the screen transmission part 43 is disposed on the inside of the screen body part 41, and permits the transmission of light. For example, the screen blocking part 42 may include a material for blocking the transmission of light, and may be applied or attached onto the inside of the screen body part 41. The screen transmission part 43 may be a region except the screen blocking part 42 and may be separately attached or applied onto the screen body part 41, thereby promoting the transmission of light and imparting light straightness. In this case, the number and shapes of the screen transmission part 43 may correspond to those of the reflection surface parts 33. For various grill lighting implementations, locations or shapes of the screen transmission parts 43 may be variously set, and a user may replace the screen unit 40, if necessary.

Figure 15:
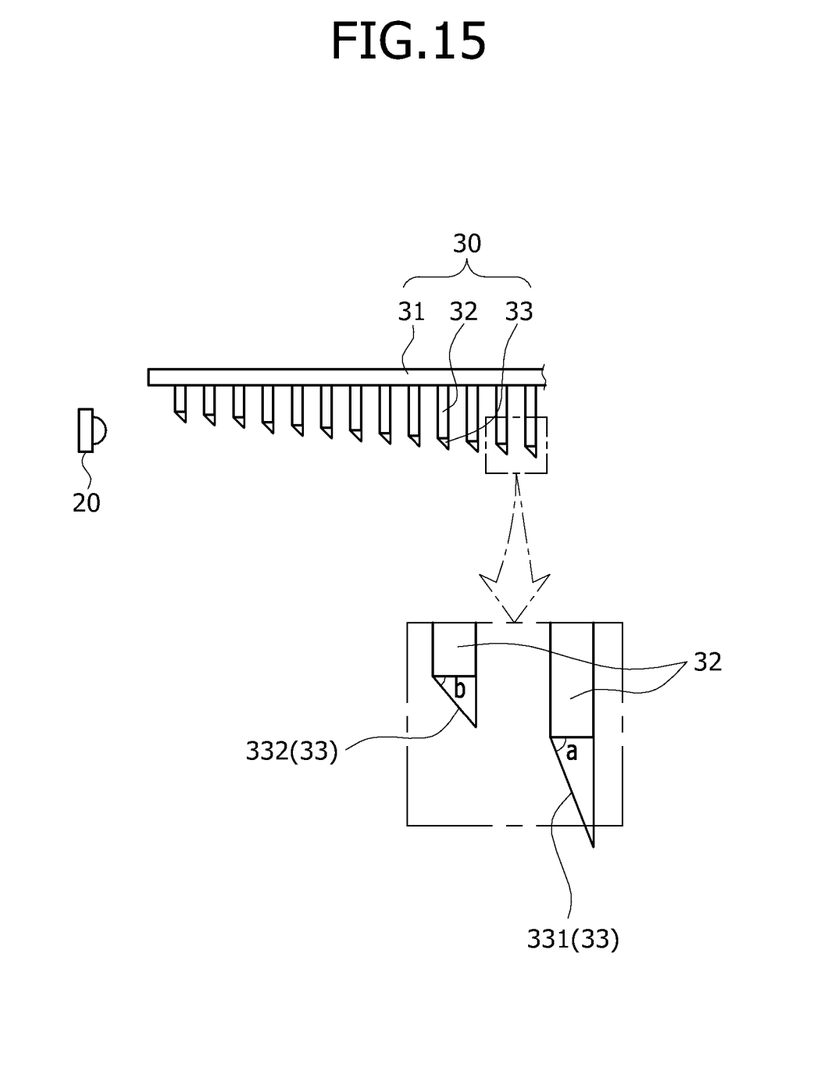
FIG. 15 is a diagram schematically illustrating tilt angles of the reflection surface parts according to an embodiment of the present disclosure.
Figure 16:
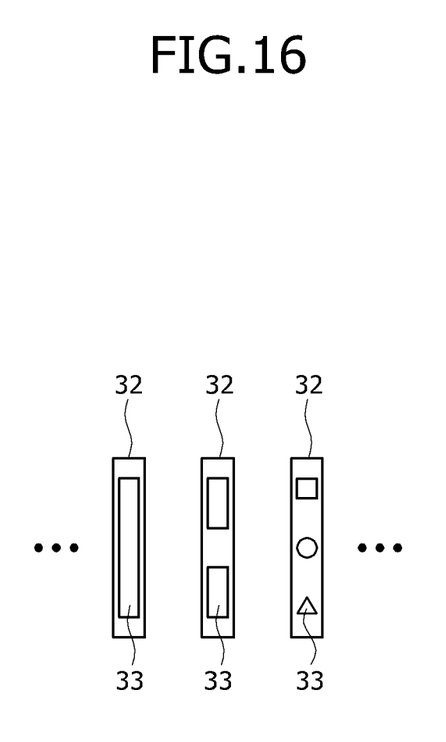
FIG. 16 is a diagram schematically illustrating the fronts of the reflection surface parts according to an embodiment of the present disclosure.

FIG. 15 is a diagram schematically illustrating tilt angles of the reflection surface parts according to an embodiment of the present disclosure. FIG. 16 is a diagram schematically illustrating the fronts of the reflection surface parts according to an embodiment of the present disclosure. Referring to FIGS. 15 and 16, the reflection surface part 33 according to an embodiment of the present disclosure has a tilt angle that increases as the reflection surface part 33 becomes distant from the light source unit 20. For example, the reflection surface parts 33 formed in the respective reflection protrusion parts 32 may be designed to have the same width and to have tilt angles for reflection that increase as the reflection surface parts 33 become distant from the light source unit 20, thus reflecting the uniform amount of light forward. That is, a first tilt angle "a" of a first inclined plane 331 farthest away from the light source unit 20 may be designed to be greater than a second tilt angle "b" of a second inclined plane 332 disposed more closely to the light source unit 20 than the first inclined plane 331. Furthermore, a tilt angle difference between the reflection surface parts 33 may be different for each section. That is, a tilt angle difference between the reflection surface parts 33 adjacent to each other in a region distant from the light source unit 20 may be greater than a tilt angle difference between the reflection surface parts 33 adjacent to each other in a region close to the light source unit 20.

A number of the reflection surface parts 33 may be determined based on a vertical length of the reflection protrusion part 32. That is, when viewed from the front, the front part of the reflection protrusion part 32 may have a pole shape having the vertical length. If the entire reflection surface part 33 is formed along the vertical length of the reflection protrusion part 32, grill lighting corresponding to the length of the reflection surface part 33 can be provided. Furthermore, if one or more reflection surface parts 33 are selectively disposed according to the vertical length of the reflection protrusion part 32, grill lighting having various dot patterns can be implemented depending on a location where the reflection surface part 33 is disposed. For example, if three reflection surface parts 33 are disposed along the vertical length of the reflection protrusion part 32, grill lighting having three dot patterns can be implemented. If the reflection surface part 33 has a pattern or figure shape, grill lighting having a corresponding pattern or figure shape can be implemented.

The assembly and operation of the lighting device for a vehicle according to an embodiment of the present disclosure, which has the above structure, are described below.

The light source unit 20 is disposed at one end or either end of the housing unit 10. The reflection unit 30 for reflecting light radiated by the light source unit 20 is disposed in the housing unit 10. Furthermore, the opening of the housing unit 10 is covered by the screen unit 40. The screen unit 40 faces the reflection unit 30.

In this case, the reflection unit 30 may be integral to or assembled with the housing unit 10, and has the plurality of reflection surface parts 33 disposed therein in order to reflect, to the screen unit 40, light emitted from the side of the reflection unit 30.

The lighting device 1 for a vehicle, which is assembled as described above, is installed in any one or more of the front part, side part and rear part of the vehicle body 100. That is, the lighting device 1 for a vehicle may be installed in the front of an electric vehicle in order to replace the existing radiator grill shape. In addition, the lighting device 1 for a vehicle may be installed in a door or a trunk and disposed in the side part or rear part of the vehicle body 100.

In this state, when power is applied by the light source unit 20, light generated by the light source unit 20 is reflected by the reflection surface parts 33 and then implements grill lighting through the screen unit 40.

In this case, if the light source unit 20 is fixed, the light radiated by the light source unit 20 is simultaneously reflected by the reflection surface parts 33, thus implementing a plurality of types of grill lighting.

Furthermore, if the light source unit 20 is rotated, the light radiated by the light source unit 20 is sequentially radiated to the reflection surface parts 33, thus implementing moving grill lighting.

The reflection surface parts 33 are designed to have different tilt angles as the reflection surface parts 33 become distant from the light source unit 20. Although the amount of light that reach the reflection surface parts 33 is insufficient as the reflection surface parts 33 become distant from the light source unit 20, uniform grill lighting can be recognized by the outside because a reflection area according to the tilt angles is increased.

The lighting device 1 for a vehicle according to an embodiment of the present disclosure can implement grill lighting for the vehicle while minimizing the number of light source units 20 because light of the light source unit 20 radiated from the side of the reflection unit 30 is reflected by the reflection unit 30 and then transmits the screen unit 40.

The present disclosure has been described with reference to the embodiments illustrated in the accompanying drawings, but the embodiments are merely illustrative. A person having ordinary knowledge in the art will understand that various modifications and other equivalent embodiments are possible from the embodiments. Accordingly, the true technical range of protection of the present disclosure should be defined by the appended claims.

What is claimed is:

1. A lighting device for a vehicle having a grill, comprising:
    a housing unit coupled to a vehicle body, longitudinally extending in a horizontal direction between first and second horizontal end portions of the housing and having an opening;
    one or more light source units configured to radiate light, each light source unit positioned at one of the first and second horizontal end portions of the housing unit and configured to horizontally radiate the light in a direction toward the other of the first and second horizontal end portions of the housing;
    a reflection unit housed at the housing unit, longitudinally extending between the first and second horizontal end portions of the housing, and configured to reflect the light radiated from the one or more light source units toward the opening of the housing; and
    a screen unit positioned in front of the reflection unit, longitudinally extending between the first and second horizontal end portions of the housing, covering the opening of the housing unit, and configured to transmit the light reflected by the reflection unit,
    wherein the reflection unit comprises:
        a reflection base part having a main surface facing the opening of the housing;
        a plurality of reflection protrusion parts protruding from the main surface of the reflection base part toward the opening of the housing and spaced apart from each other; and
        a plurality of reflection surface parts, each positioned at an end of one of the reflection protrusion parts and configured to reflect the light radiated from one of the light source units, and
    wherein two or more reflection surface parts are positioned at the end of some of the reflection protrusion parts and spaced apart from each other.

2. The lighting device of claim 1, wherein the housing unit is disposed at one or more of a front part, side part, and rear part of the vehicle body.

3. The lighting device of claim 1, wherein the housing unit comprises:
    a housing rear part at which the reflection unit is positioned;
    a housing top part extending forward from a top of the housing rear part and configured to reflect the light; and
    a housing bottom part extending forward from a bottom of the housing rear part, facing the housing top part and configured to reflect the light.

4. The lighting device of claim 1, wherein each light source unit comprises:
    a light source case part positioned at one of the first and second horizontal end portions of the housing unit; and
    a light source lamp part coupled to the light source case part and configured to radiate the light in a direction toward the reflection unit.

5. The lighting device of claim 4, wherein the light source unit further comprises a light source rotation part configured to rotate the light source case part.

6. The lighting device of claim 4, wherein the light source unit further comprises:
    a light source transmission part positioned on the light source case part and configured to transmit the light radiated from the light source lamp part; and
    a light source change part positioned in the light source transmission part and configured to change a light pattern of the light radiated from the light source lamp part.

7. The lighting device of claim 1, wherein a reflection angle of each reflection surface part is proportional to a distance between each reflection surface part and the light source unit.

8. The lighting device of claim 1, wherein a number of the reflection surfaces of each reflection surface part is determined based on a vertical length of the reflection protrusion part.

9. The lighting device of claim 8, wherein the reflection surfaces have a pattern or figure shape.

10. The lighting device of claim 1, wherein a protrusion length of each reflection surface part is proportional to a distance between each reflection surface part and the one or more light source units.

11. The lighting device of claim 1, wherein:
    the one or more light source units comprises first and second light source units respectively positioned at the first and second horizontal end portions of the housing unit, and
    a protrusion length of each reflection surface part is proportional to a distance between each reflection surface part and one of the first and second light source units closer to each reflection surface part.

12. The lighting device of claim 1, wherein:
    the reflection base part comprises a plane, and
    at least some of the reflection protrusion parts positioned adjacent to each other have mutually different protrusion lengths.

13. The lighting device of claim 1, wherein:
    the reflection base part comprises a curved surface, and
    at least some of the reflection protrusion parts have mutually different protrusion lengths.

14. The lighting device of claim 1, wherein the reflection unit and the housing unit are two separate units assembled to each other.

15. The lighting device of claim 1, wherein the reflection unit is integral to the housing unit.

16. The lighting device of claim 1, wherein the screen unit comprises:
    a screen body part coupled to the housing unit;
    a screen blocking part coupled to the screen body part and configured to block a transmission of a first portion of the light reflected by the reflection unit; and
    a screen transmission part coupled to the screen body part and configured to permit a transmission of a second portion of the light reflected by the reflection unit.

* * * * *